(No Model.) 7 Sheets—Sheet 1.

G. W. KING.
LOADING OR UNLOADING MACHINE.

No. 494,813. Patented Apr. 4, 1893.

Fig.1

Witnesses:
J. F. Coleman
G. F. Downing

Inventor
G. W. King
By Leggett & Leggett
Attys.

(No Model.)  7 Sheets—Sheet 2.
G. W. KING.
LOADING OR UNLOADING MACHINE.

No. 494,813. Patented Apr. 4, 1893.

Witnesses
J. R. Coleman,
G. F. Downing.

Inventor
G. W. King
By Leggett & Leggett
Att'ys.

(No Model.) 7 Sheets—Sheet 3.

G. W. KING.
LOADING OR UNLOADING MACHINE.

No. 494,813. Patented Apr. 4, 1893.

fig.3

Witnesses.
J. W. Coleman
G. F. Downing.

Inventor
G. W. King
By Leggett & Leggett
Att'ys.

(No Model.) 7 Sheets—Sheet 4.

G. W. KING.
LOADING OR UNLOADING MACHINE.

No. 494,813. Patented Apr. 4, 1893.

Fig. 4.

Witnesses.
J. F. Coleman
G. F. Downing

Inventor:
G. W. King
By Leggett & Leggett
Attys.

(No Model.) 7 Sheets—Sheet 5.

G. W. KING.
LOADING OR UNLOADING MACHINE.

No. 494,813. Patented Apr. 4, 1893.

Fig. 5

Witnesses.
J. F. Coleman
G. F. Downing.

Inventor
G. W. King
By Leggett & Leggett
Att'ys.

(No Model.) 7 Sheets—Sheet 6.

G. W. KING.
LOADING OR UNLOADING MACHINE.

No. 494,813. Patented Apr. 4, 1893.

Witnesses.
J. P. Coleman
G. F. Downing

Inventor
G. W. King
By Leggett & Leggett
Attys.

(No Model.) 7 Sheets—Sheet 7.
G. W. KING.
LOADING OR UNLOADING MACHINE.

No. 494,813. Patented Apr. 4, 1893.

fig. 7 fig. 10 fig. 8.

Witnesses.
J. F. Coleman
G. F. Downing.

Inventor
G. W. King
By Leggett & Leggett
Attys.

UNITED STATES PATENT OFFICE.

GEORGE W. KING, OF MARION, OHIO.

LOADING OR UNLOADING MACHINE.

SPECIFICATION forming part of Letters Patent No. 494,813, dated April 4, 1893.

Application filed September 16, 1892. Serial No. 446,067. (No model.)

*To all whom it may concern:*

Be it known that I, GEORGE W. KING, a resident of Marion, in the county of Marion and State of Ohio, have invented certain new and useful Improvements in Loading or Unloading Machines; and I do hereby declare the following to be a full, clear, and exact description of the invention, such as will enable others skilled in the art to which it appertains to make and use the same.

My invention relates to an improvement in loading or unloading machines,—and more particularly to machines for loading heavy logs or other heavy articles on cars or unloading them therefrom,—the object of the invention being to provide effectual mechanism whereby to swing the machine during the operation of loading or unloading.

A further object is to improve the construction and arrangement of loading or unloading machines.

A further object is to provide a machine for loading or unloading logs, with simple and effectual devices whereby the grappling hooks which grasp the log or other heavy article, shall be lowered to the proper point for receiving said logs or other heavy article.

With these objects in view the invention consists in certain novel features of construction and combinations and arrangements of parts as hereinafter set forth and pointed out in the claims.

In the accompanying drawings.

Figure 6:
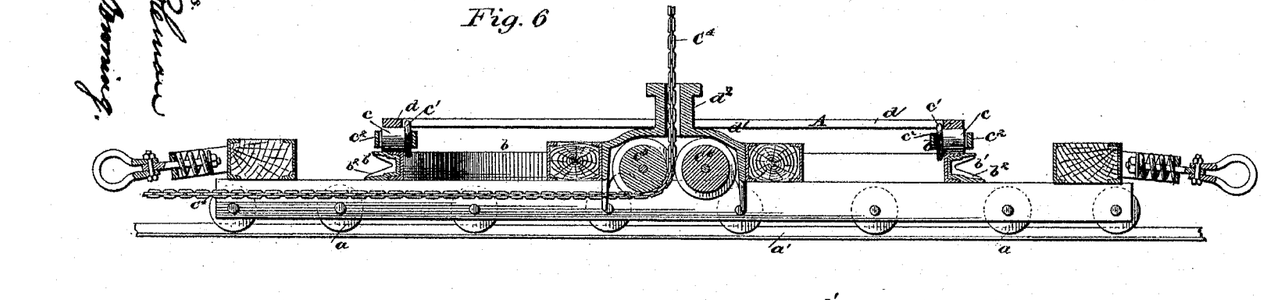
Fig. 6 is a sectional view on the line $x-x$ of Fig. 5.
Figure 7:
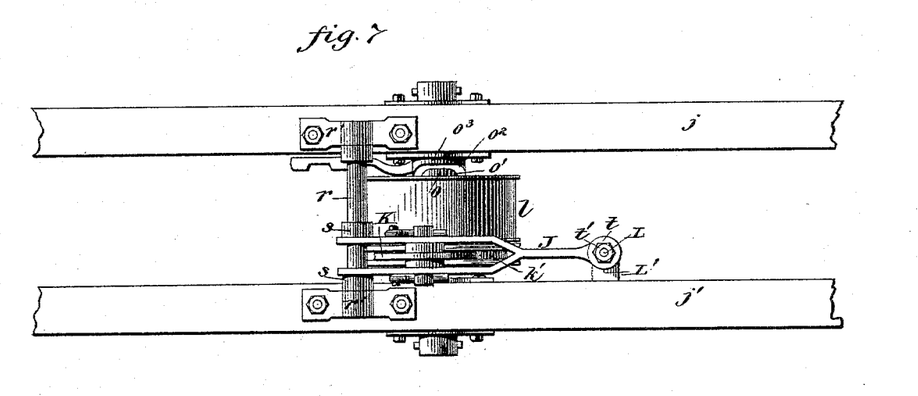
Fig. 7 is a plan view of a portion of the boom and the friction devices located thereon for feeding the hoisting chain and the grappling devices carried thereby.

A represents a truck frame, provided with a number of wheels $a$ adapted to run on rails $a'$,—which latter are located in proximity to the railroad track on which the flat cars to be loaded or unloaded, are located. On the truck frame A is a circular track $b$ having a peripheral groove $b'$ for the reception of the "swinging" chain, as hereinafter explained, said groove being made rough by means of projections or teeth $b^2$, whereby to prevent said chain from slipping. Located and adapted to run on this circular track is a series of rollers or wheels $c$, each having a flange $c'$ to project parallel with the inner face of the track,— said rollers or wheels $c$ being mounted in and supported by a circular frame $c^2$ as shown most clearly in Figs. 1, 3 and 6. Located on the circular series of rollers or wheels $c$, is a ring $d$ on which the car B is supported, said car being adapted to carry the operating mechanism. A bracket $d'$ is located on the truck frame A, preferably at or near its center, and projecting upwardly from this bracket is a pivot post $d^2$, which enters the bottom of the cab B. Thus it will be seen that the bottom of the car B and the ring $d$, together with the wheels or rollers $c$, and the circular track $b$ constitute a turntable.

Figure 1:
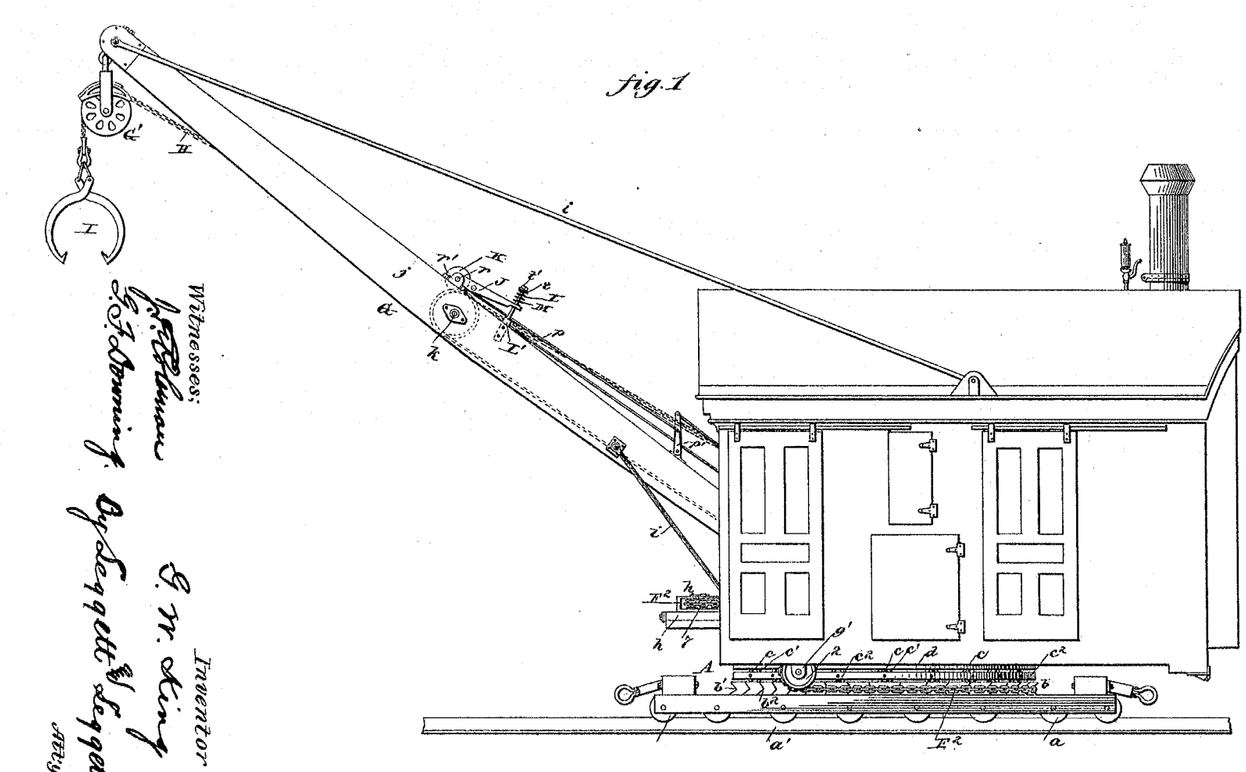
Figure 1 is a side elevation of the complete machine.
Figure 2:
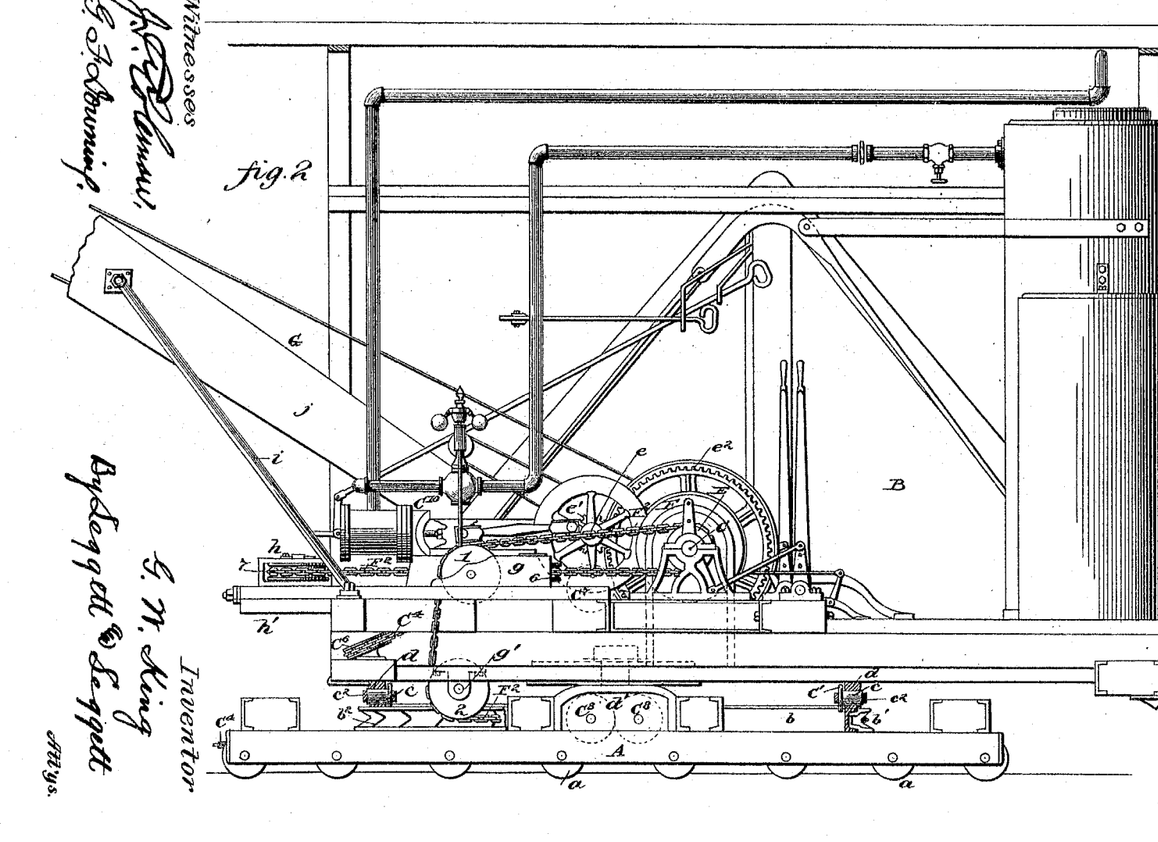
Fig. 2 is a side view partly in section.
Figure 3:
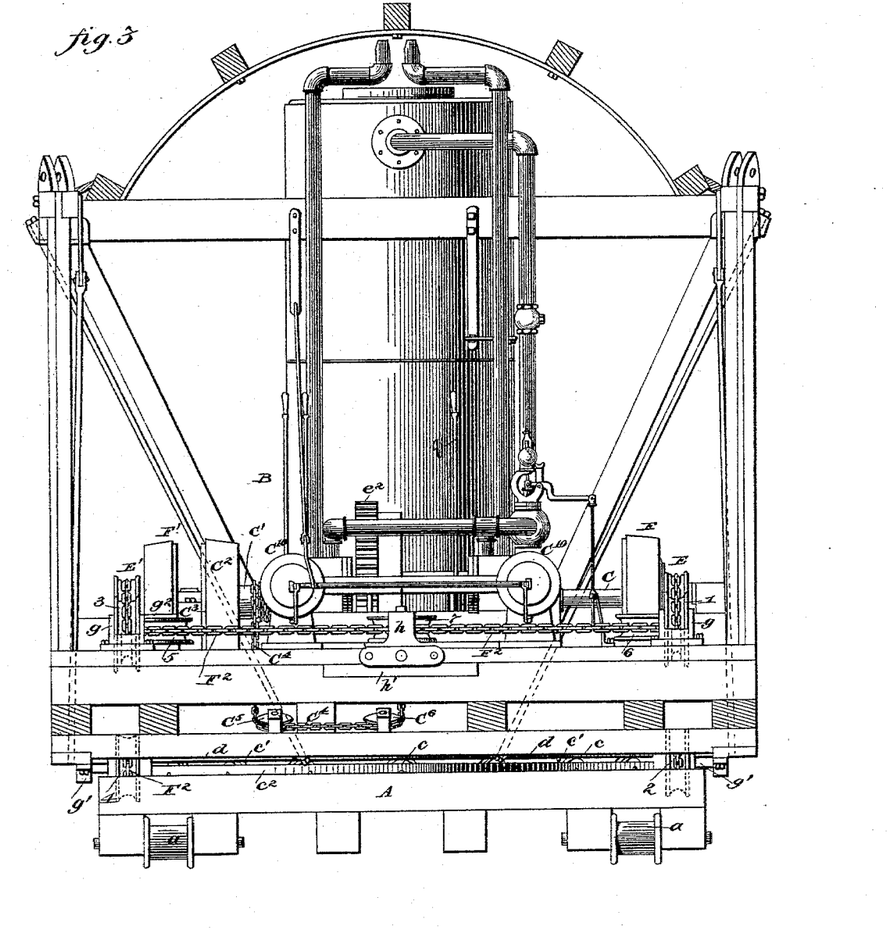
Fig. 3 is an end view partly in section.
Figure 4:
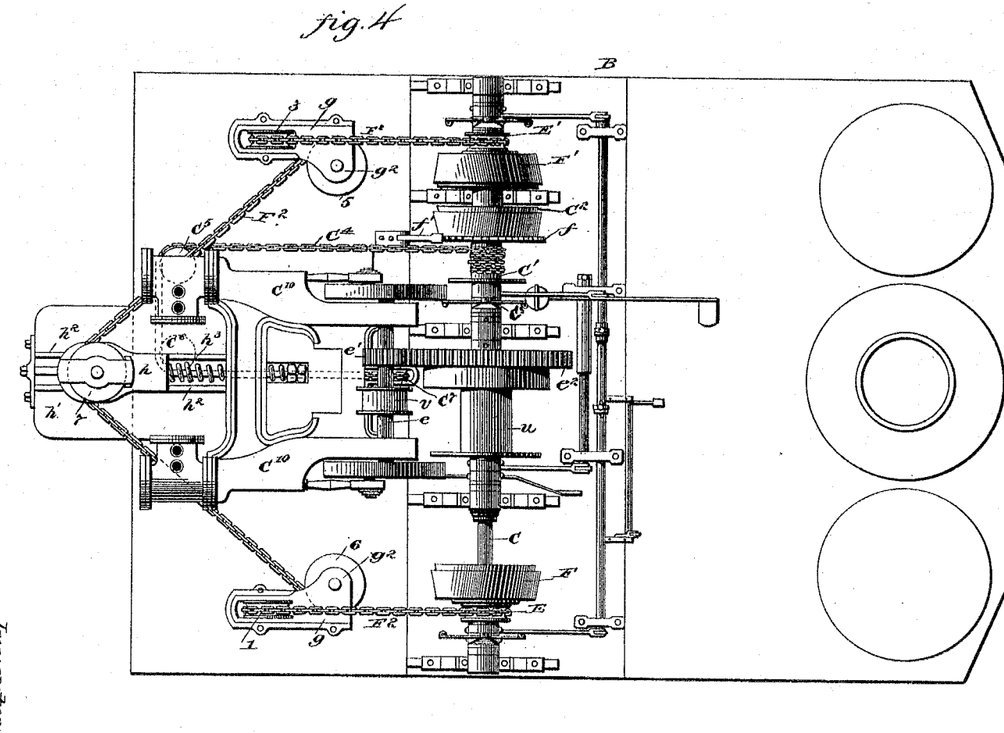
Fig. 4 is a plan view.
Figure 5:
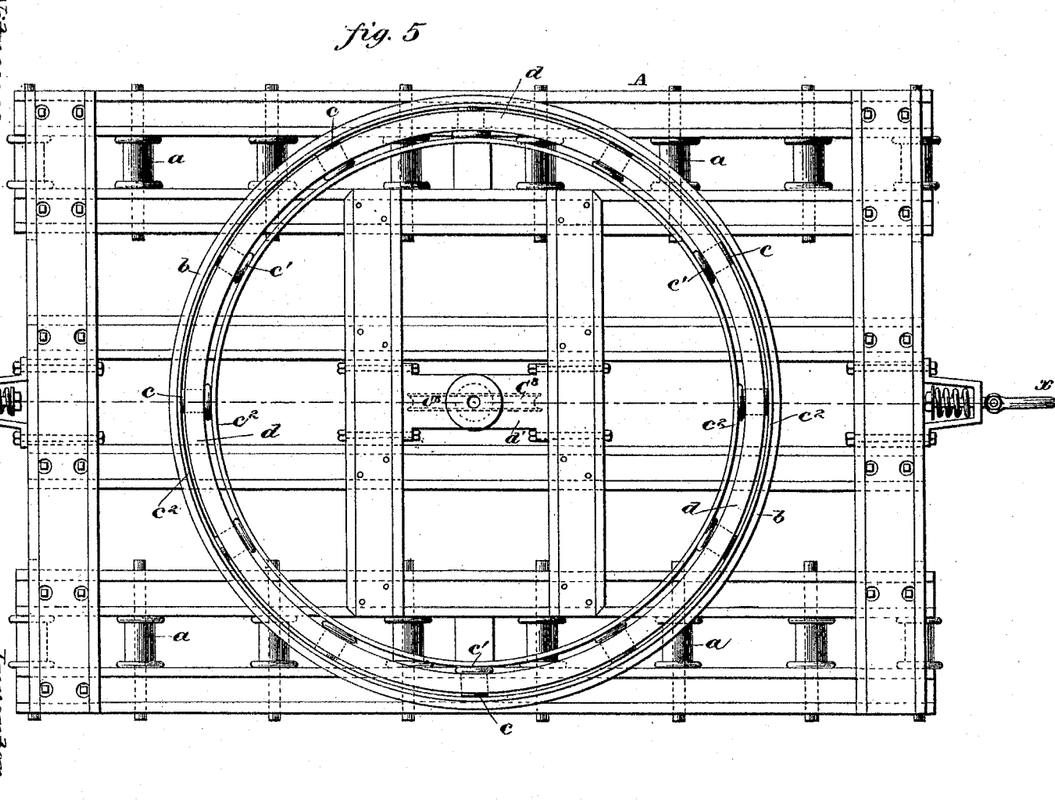
Fig. 5 is a plan view of the truck and turntable.

Within the car B a steam engine $C^{10}$ or other suitable motor, is located, and means for supplying power or motive force for said engine or motor are located within the car or cab. The engine $C^{10}$ is adapted to drive a shaft $e$, on which a pinion $e'$ is secured, said pinion being adapted to mesh with a gear wheel $e^2$ carried by a shaft C, which latter preferably extends from one side of the cab to the other. The shaft C is driven in one direction only. Mounted loosely on the shaft C preferably in proximity to its ends, are sprocket wheels E, E', and adjacent to said sprocket wheels, clutches F, F' are located, whereby to cause the sprocket wheels to rotate with the shaft C when desired. A bracket $g$ is located in advance of the shaft C and in line with the sprocket wheel E, in which bracket a sprocket wheel $l$, is located, as shown in Figs. 3 and 4. Beneath the sprocket wheel $l$, a sprocket wheel 2 is mounted in suitable brackets $g'$ depending from the bottom of the car or turntable. A sprocket wheel 3 is mounted is a bracket $g$ located in advance of the sprocket wheel E', and beneath the sprocket wheel 3 a sprocket wheel 4 is mounted in brackets $g'$, depending from the bottom of the car or turntable. The brackets $g$ are each provided with ears $g^2$ between which sprocket wheels 5, 6, are mounted. A bracket $h$ is also mounted on a timber $h'$ projecting forwardly from the car, as shown in Figs. 1 and 4, and in this bracket a sprocket wheel 7 is mounted. The bracket $h$ is adapted to have a sliding movement in ways $h^2$ in the timber $h'$ and is yieldingly forced forward by a spring $h^3$ located behind it as shown in Fig. 4. Over the sprocket wheels above mentioned and about the circular track $b$, an endless chain $F^2$ passes, as follows: From the sprocket wheel E, the chain $F^2$ passes over the wheel $l$, thence downwardly about the wheel 2, thence about the circular track $b$ in the groove $b'$ thereof,—thence about the sprocket wheel 4, thence upwardly over the sprocket wheel 3, thence over the sprocket wheel E', thence over the sprocket wheel 5, thence over the sprocket wheel 7, thence over the sprocket wheel 6 and finally back to the sprocket wheel E. Thus it will be seen that when it is desired to swing the car B and the machinery which it carries, in one direction, the wheel E will be made to rotate with the shaft C by means of the adjacent clutch F, and that when it is desired to swing it in the other direction the sprocket wheel E' will be made to rotate with the shaft C by means of the clutch F'. When the machine is thus operated, the necessary slack and freedom of action will be imparted to the swinging chain $F^2$, by the yielding of the wheel 7.

By the construction and arrangement of parts as above described, very simple and efficient devices are provided for swinging the car and the machinery which it carries in either direction, such swinging being accomplished by power from the engine on said car, by simply manipulating the clutches F, F', to throw the sprocket wheels E, or E' into gear.

On the shaft C a drum C' is loosely mounted and carries a ratchet wheel $f$ adapted to be engaged by a dog $f'$, whereby to prevent retrograde movement of said drum. The drum C' is operated by means of a cone friction $C^2$ which locks the drum to the shaft and a spiral clutch $C^3$ working on the shaft crowds the drum on the friction. From this drum a chain or cable $C^4$ is run through a sheave $C^5$, from whence it passes through a sheave $C^6$, thence through a sheave $C^7$, thence downwardly through the center casting or pivot post $d^2$ and thence forwardly between pulleys $C^8$, and at its end is made fast to any suitable object. From this construction and arrangement of parts it will be seen that when the drum C' is thrown into action and through the medium of the chain or cable $C^4$, the machine will be moved endwise along the track.

A boom G projects forwardly from the car, being properly braced by means of rods $i$ and provided at its forward end with a depending pulley G', over which the hoisting chain H is adapted to pass, and to the free end of the hoisting chain, grappling hooks or tongs I are attached, said grappling hooks or tongs being adapted to grasp a heavy log or other heavy article.

Figure 8:
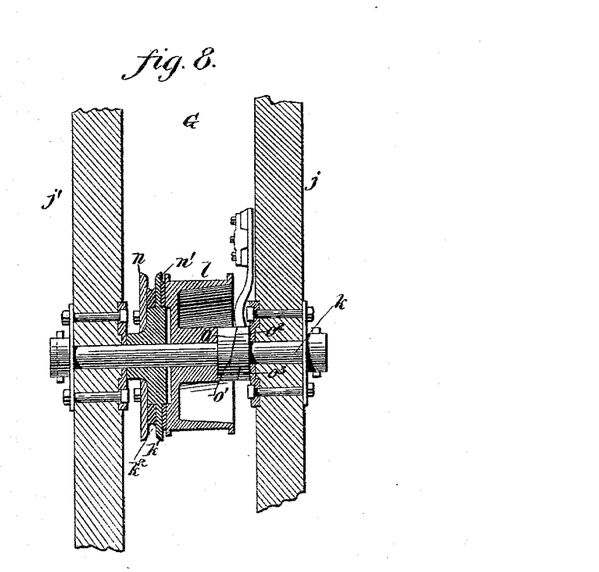
Fig. 8 is a sectional view on the line $y-y$ of Fig. 10.
Figure 9:
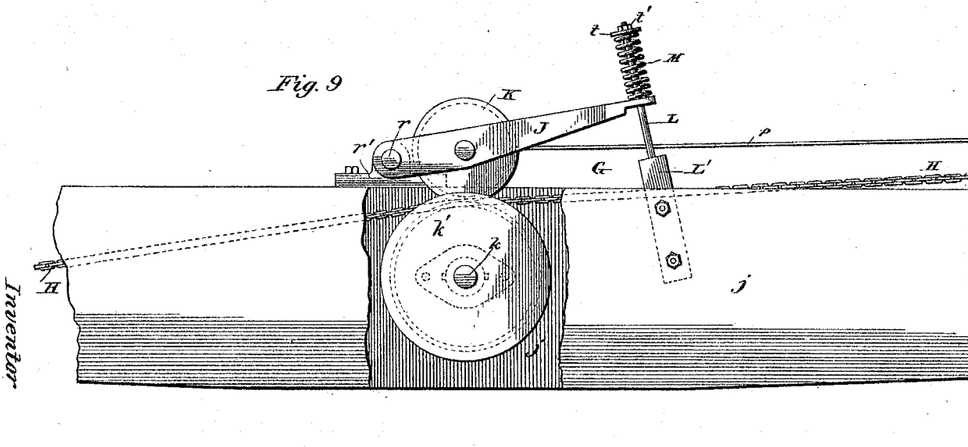
Fig. 9 is a side elevation of the boom showing the feed devices for hoisting chain.

In the timbers $j, j'$ comprising the boom G, at a point between the ends of said boom, a shaft $k$ is located, on which a pulley $k'$ is loosely mounted, said pulley having a deep groove $k^2$ in its periphery. The pulley $k'$ may be made in two parts $n, n'$, as shown in Fig. 8, and the two parts bolted together. Mounted to rotate with the shaft $k$ and have a sliding movement thereon, is a band or belt wheel $l$ adapted to make frictional engagement with the pulley $k'$. The band wheel $l$ carries a collar $o$ having a cam face $o'$, which is adapted to be engaged by the cam face $o^2$ of a clutch collar $o^3$ mounted on the shaft $k$. A rod $p$ is connected at one end with a clutch collar $o^3$ and at the other end to a lever $p'$, which latter is connected by a suitable rod with an operating lever $q$ in the car or cab.

Figure 10:
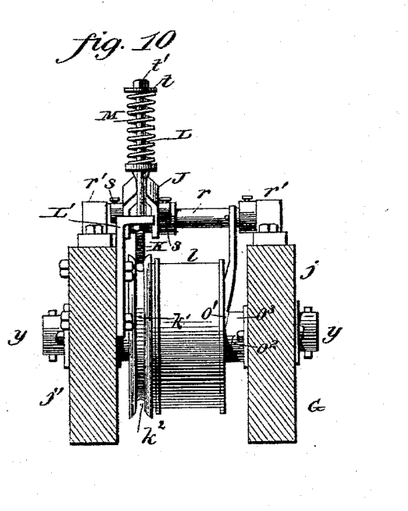
Fig. 10 is an end view illustrating the frictional feeding devices for the hoisting chain, shown in Figs. 7, 8 and 9.

A shaft $r$ is mounted in suitable brackets $r'$ on the boom G and has pivotally connected to it, the bifurcated end of a lever J, which is maintained in proper position on the shaft $r$ by means of adjustable collars $s$. Mounted in the bifurcated lever J is a pulley K having a narrow concave periphery adapted to enter the groove $k^2$ of the pulley $k'$, as shown in Fig. 10. The free end of the lever J is perforated for the accommodation of a rod L, which passes through it, said rod being supported by means of a bracket L' secured to one of the timbers of the boom G. A spring M encircles the rod L and at its lower end bears against the lever J. The other end of the spring M bears against a washer $t$ retained on the rod L by means of a nut $t'$. By the employment of the devices last above described, the pulley K will be normally retained within the groove of the pulley $k'$, and will be made to bear with a yielding pressure upon the hoisting chain H passing between the pulleys $k'$ K. The hoisting chain is wound upon the drum $u$ mounted loosely on the shaft C and passes forwardly between the pulleys K, $k'$ and then over the pulley G' at the forward end of the boom and has secured to its free end, the tongs I as above explained. Motion will be imparted to the band wheel $l$ by means of a suitable strap which derives its motion from a band wheel $v$ carried by the engine shaft. From this construction and arrangement of parts it will be seen that the band wheel $l$ runs continuously. When it is desired to pull the cable or hoisting chain H off of the drum $u$, the clutch collar $o^3$ will be operated, through the medium of the operating lever $p'$ and connecting rods, and made to move the clutch $o$, so as to crowd the band wheel $l$ against the pulley $k'$, causing said pulley to rotate, thus causing the hoisting chain or cable H to be payed out or pulled off of the drum $u$. When it is desired to wind the hoisting chain on the drum $u$ to elevate the tongs I, and the load carried thereby, the lever $p'$ will be operated to move clutch collar $o^3$ away from the clutch collar $o$ to stop the rotation of the pulley $k'$. The drum $u$ is then made to rotate with the shaft $C$ by means of a clutch $C^9$.

The machine is designed to travel lengthwise over a train of flat cars or logging cars and is passed from one car to another, always loading or unloading the car next to it, and in this way, operations can be continued until the entire train is loaded with logs or other articles, or the logs or other devices unloaded therefrom. In the meantime the train is moved back and forth, so as to keep the loader or unloader at the most convenient point along the track.

The machine is very easy to manipulate, and is effectual in the performance of its functions.

Having fully described my invention, what I claim as new, and desire to secure by Letters Patent, is—

1. The combination with a truck, a circular track located thereon and having a peripheral groove and a platform or turntable adapted to turn on said circular track, of a shaft mounted on the platform or turntable, a motor for driving said shaft, two sprocket wheels mounted loosely on said shaft, a clutch for each sprocket wheel whereby to cause it to rotate with the shaft, a series of sprocket wheels mounted on the platform or turntable, one of said series of sprocket wheels being mounted in yielding bearings, and an endless chain passing over all of said sprocket wheels and through the peripheral groove of the circular track, substantially as set forth.

2. The combination with a truck, a circular track located thereon and having a peripheral groove and a platform or turntable adapted to run on said circular track, of a shaft mounted on the platform or turntable, a motor for driving said shaft, two sprocket wheels mounted loosely on said shaft, a clutch for each sprocket wheel whereby to cause it to rotate with the shaft at will, a pair of vertical sprocket wheels carried by the platform or turntable in advance of each sprocket wheel on the shaft, a series of horizontal sprocket wheels, and an endless cable adapted to pass over all of said sprocket wheels and through the peripheral groove of the circular track, substantially as set forth.

3. In a hoisting machine the combination with a boom or traveling crane, a drum and means for rotating the same, of a hoisting chain adapted to be wound on said drum, and extending over a pulley at the forward end of the boom, hoisting chain, friction pulleys carried by the boom and means for actuating said friction pulleys to cause them to feed the hoisting chain forward, substantially as set forth.

4. In a hoisting machine, the combination with a platform a boom carried thereby, a drum and means for rotating the same, of a hoisting chain adapted to be wound on said drum, and extending over a pulley at the forward end of the boom, grappling hooks carried by the forward end of said hoisting chain, two friction pulleys carried by the boom, between which the hoisting chain passes, one of said pulleys having a deep groove into which the periphery of the other pulley enters, and means for causing said pulleys to feed the hoisting chain forward, substantially as set forth.

5. In a hoisting machine, the combination with a platform, a boom carried thereby, a hoisting chain, a drum for the reception of said hoisting chain, and an engine for driving said drum, of friction pulleys carried by said boom, between which the hoisting chain is adapted to pass and means for causing said friction pulleys to act positively on the hoisting chain, whereby they will be caused to feed the hoisting chain forward, substantially as set forth.

6. In a hoisting machine, the combination with a platform, a boom, a hoisting chain, a drum for the reception of said hoisting chain and an engine for driving said drum, of a grooved pulley mounted on the boom, means for throwing said pulley into and out of action, and a friction wheel or pulley constructed and arranged to bear on the hoisting chain with a yielding pressure, substantially as set forth.

7. In a hoisting machine, the combination with a boom and a hoisting chain, of a grooved pulley carried by the boom, means for actuating said pulley, a lever carried by said boom in proximity to the grooved pulley, a friction wheel or pulley carried by said lever, and means connected with the lever to cause the friction wheel to bear on the hoisting chain with a yielding pressure, substantially as set forth.

8. In a hoisting machine, the combination with a platform, a boom supported thereby, a hoisting chain and a drum for the reception of the hoisting chain and an engine for driving said drum, of a grooved pulley carried by said boom, means for driving said grooved pulley, a lever pivotally connected to the boom in proximity to said grooved pulley, a friction wheel or pulley carried by said lever, a rod supported in proximity to the free end of the lever and passing through the same and a spring encircling said rod to cause the friction wheel or pulley to bear on the hoisting chain with a yielding pressure, substantially as set forth.

9. In a hoisting machine, the combination with a platform, a boom supported thereby, a hoisting chain and a drum for the reception of said hoisting chain and a motor for driving said drum, of a shaft mounted on the boom, a grooved pulley carried by said shaft, a band wheel carried by the shaft, a clutch on the shaft adapted to slide said band wheel into and out of contact with the pulley, a rod connected with said clutch at one end and at the other end to a lever pivotally connected to the boom in proximity to the platform, another rod pivotally connected to the last mentioned lever, and an operating lever carried by the platform, whereby to operate the clutch and a friction wheel or pulley adapted to normally bear on the hoisting chain which passes between said pulleys, substantially as set forth.

10. In a hoisting machine, the combination with a platform, a boom supported thereby, a hoisting chain, a drum for the reception of the hoisting chain, an engine and an engine shaft, of friction pulleys carried by the boom, between which the hoisting chain is adapted to pass, a band wheel carried by the shaft of one of said friction pulleys, a band wheel carried by the engine shaft and a band connecting said band wheels, a clutch on the shaft of the band wheel and friction pulley on the boom and means for operating said clutch to force the band wheel in engagement with the pulley, substantially as set forth.

11. In a hoisting machine, the combination with a shaft, a drum carried thereby, and means for causing said drum to rotate with the shaft, of a series of sheaves and a cable wound upon said drum and passing through said sheaves, and adapted to be attached at its free end to an object independent of the machine, substantially as set forth.

12. In a hoisting machine, the combination with a shaft, a drum mounted on said shaft, means for driving the shaft and means for causing the drum to rotate with the shaft, of a series of sheaves, a hollow post supporting the machine and a cable wound upon said drum and passing through said sheaves and hollow post and adapted to be attached to an object independent of the machine, substantially as set forth.

13. In a hoisting machine, the combination with a shaft, a drum mounted on said shaft and means for rotating said shaft, of a friction device, a clutch for forcing said drum into engagement with the friction device, a series of sheaves and a cable wound upon said drum and passing through said sheaves, said cable being adapted to be attached to an object independent of the machine, substantially as set forth.

14. In a hoisting machine, the combination with a shaft, a drum mounted on said shaft, means for rotating said shaft, and means for causing the drum to rotate with the shaft, of a series of sheaves, a hollow post supporting the machine, pulleys mounted in proximity to said hollow post and a cable wound upon said drum and extending through said sheaves and the hollow post and between said pulleys, the free end of said cable being adapted to be secured to an object independent of the machine, substantially as set forth.

In testimony whereof I have signed this specification in the presence of two subscribing witnesses.

GEORGE W. KING.

Witnesses:
JOHN A. WOLFORD,
R. W. TILTON.